United States Patent [19]

Ahne et al.

[11] Patent Number: 4,590,103

[45] Date of Patent: May 20, 1986

[54] METHOD FOR THE PREPARATION OF THIN POLYIMIDE FILM

[75] Inventors: Hellmut Ahne, Röttenbach; Wolfgang Kleeberg, Erlangen; Roland Rubner, Röttenbach; Hans Krüger, Munich, all of Fed. Rep. of Germany

[73] Assignee: Siemens Aktiengesellschaft, Berlin and Munich, Fed. Rep. of Germany

[21] Appl. No.: 622,387

[22] Filed: Jun. 20, 1984

Related U.S. Application Data

[63] Continuation of Ser. No. 537,685, Sep. 30, 1983, abandoned, which is a continuation of Ser. No. 350,769, Feb. 22, 1982, abandoned.

[30] Foreign Application Priority Data

Feb. 27, 1981 [DE] Fed. Rep. of Germany ....... 3107633

[51] Int. Cl.$^4$ .............................................. B05D 3/02
[52] U.S. Cl. ................................. 427/387; 427/385.5; 427/389.7
[58] Field of Search ................. 427/385.5, 108, 387, 427/162, 271, 389.7; 428/1, 473.5; 264/235, 236

[56] References Cited

U.S. PATENT DOCUMENTS

| | | | |
|---|---|---|---|
| 3,558,350 | 1/1971 | Fincke et al. | 427/385.5 |
| 3,666,528 | 5/1972 | Barnhardt | 427/379 |
| 3,957,512 | 5/1976 | Kleeberg et al. | 430/283 X |
| 4,048,144 | 9/1977 | Stephens | 428/473.5 X |
| 4,068,923 | 1/1978 | Toida | 350/160 LC |
| 4,405,770 | 9/1983 | Schoenberg et al. | 428/473.5 X |

*Primary Examiner*—Thurman K. Page
*Attorney, Agent, or Firm*—Kenyon & Kenyon

[57] ABSTRACT

The invention relates to a method for the preparation of thin polyimide layers by applying a solution of a polyimide prepolymer to a substrate, and subsequently annealing, and has as its object the provision of a method of this type in such a way that the preparation of layers with layer thicknesses of $\leq 0.2$ μm is made possible which layers have a homogeneous character and exhibit good adhesion. For this purpose, the invention provides that film-forming prepolymers of highly heat-resistant polyimides are used which prepolymers give off a high percentage of volatile products in annealing. The method according to the invention is particularly suitable for the production of orientation layers for liquid-crystal displays.

3 Claims, No Drawings

METHOD FOR THE PREPARATION OF THIN POLYIMIDE FILM

This application is a continuation of application Ser. No. 537,685, filed Sept. 30, 1983 now abandoned, which is a continuation of application Ser. No. 350,769 filed Feb. 22, 1982 and now abandoned.

BACKGROUND OF THE INVENTION

The present invention relates to a method for the preparation of thin polyimide films by applying a solution of a polyimide prepolymer to a substrate and subsequently annealing the prepolymer.

The preparation of thin films, i.e., films with a thickness of less than or equal to about 0.2 μm, often presents serious problems. Thin films are used, for example, as orientation layers in the form of so-called rubbed layers in liquid-crystal displays. For this use, the films must be transparent, possess only little intrinsic coloring and, in particular, must have a homogeneous closed surface.

To date, thin layers of organic materials are generally produced from polymers by means of the centrifuging technique, the roller-coating method or by fluidized sintering. However, sufficiently thin layers frequently are not obtained using these methods.

For preparing polyimide orientation layers for liquid-crystal displays, the procedure generally is to dissolve a polyamido carboxylic acid in a solvent and to apply it to a transparent substrate, i.e., an electrode layer or an electrode base plate. The polyamido carboxylic acid is a prepolymer for a polyimide. After the coating, the film coating is heated to an elevated temperature, i.e., annealed, whereby the polyimide is formed from the polyamido carboxylic acid (see in this connection, U.S. Pat. No. 4,068,923). However, the generally required use of highly diluted solutions causes problems with respect to the wettability and hence, the homogeneity of the layers obtained.

SUMMARY OF THE INVENTION

It is accordingly an object of the present invention to develop a method of the type mentioned at the outset in such a way that the preparation of films with a layer thickness of $\leq 0.2$ μm which exhibit a homogeneous character and have good adhesion becomes possible.

According to the present invention, this is achieved by the provision that film-forming prepolymers of highly heat-resistant polyimides are used which give off a large percentage of volatile products in the annealing process.

In the method of the present invention, thin coherent films are prepared in a manner such that first, thin coatings are generated on substrates or foils. In the subsequent annealing process, these coatings then give off volatile components, whereby a reduction of the layer thickness is obtained. The reduction of the layer thickness can be 40% and more without adverse effects on the quality of the films.

In the method according to the present invention, prepolymers, i.e., polymeric precursor stages (polymer is used here in the sense of including oligomers), of polyimides are employed which have film-forming properties, and the film thickness of which is greatly reduced by an annealing process. The films formed in this process can withstand heavy thermal stress and their quality with respect to homogeneity and adhesion is practically unaffected by the annealing process. Indeed, the annealing may bring about positive improvements in this regard.

The method according to the present invention is particularly well suited for the preparation of rubbed layers which serve for the orientation of the liquid crystals in liquid crystal displays, since with the method of the present invention, more concentrated and better wetting solutions can be used, so that the difficulties which can arise with the use of diluted solutions are avoided. In addition, homogeneous layers with layer thicknesses of $\leq 0.02$ μm can be produced with the method of the present invention, even using conventional coating techniques, such as roller coating and centrifuging.

Preferably, prepolymers are used in the method according to the present invention which split off high molecular weight alcohols in the annealing process in which the prepolymers change into the polyimides. Such compounds are in particular polyamido carboxylic acid esters.

The polyimide prepolymers used in the method according to the present invention have generally the following structure:

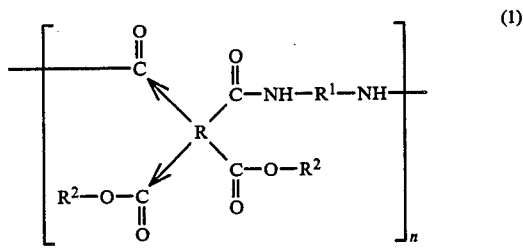

The arrows are used to express the fact that the two substituents at R can interchange their positions. This is significant because R is a cyclical radical, as is explained in the following.

In Formula (1), n is an integral number from 2 to about 100, and the following applies to the radicals R, $R^1$ and $R^2$:

R is an at least partially aromatic and/or heterocyclic tetravalent, i.e., tetrafunctional, radical, optionally halogenated, in which two respective valences are arranged in adjacent positions; if the radical R comprises several aromatic and/or heterocyclic structure elements, then the valence pairs are at the respective structure elements in end positions;

$R^1$ is a divalent, i.e., difunctional, radical, optionally halogenated, of aliphatic and/or cycloaliphatic structure, optionally having heteroatoms, and/or aromatic and/or heterocyclic structure; and $R^2$ is an alkyl radical or a hydroxyalkyl radical which may be esterified (with saturated or unsaturated carboxylic acids).

The radicals R, $R^1$ and $R^2$ have, in particular, the following meaning:

R = 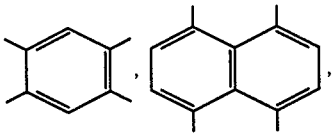,

-continued
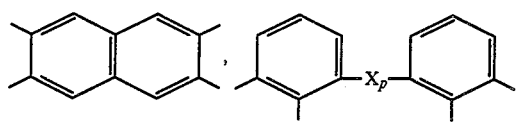
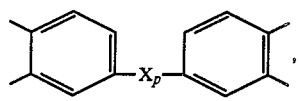
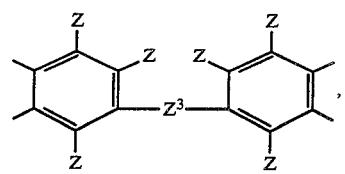
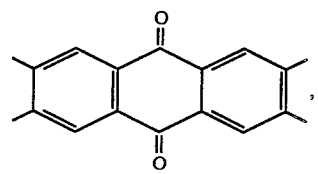
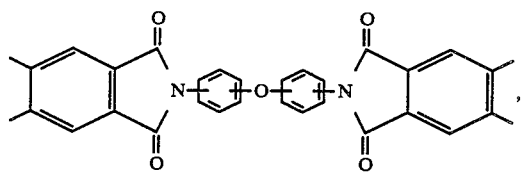
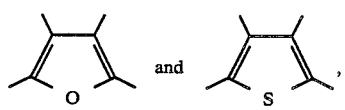
where p=0 or 1 and X stands for one of the following radicals:
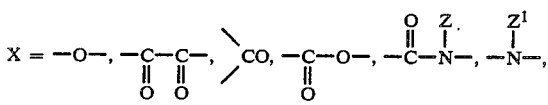
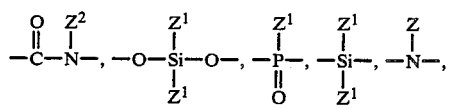
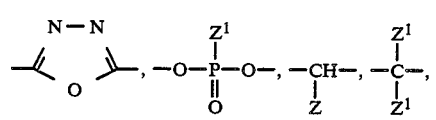
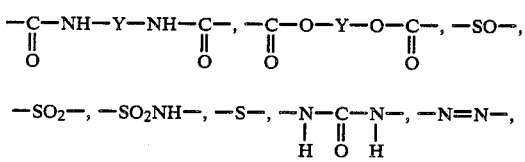
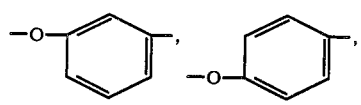
-continued
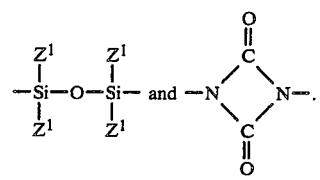
For further radicals, the following applies:
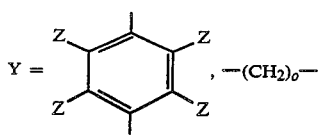
with o=2 to 10, and
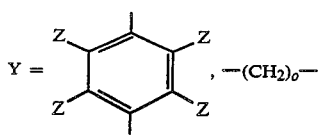
with p=0 or 1.
Z=H or alkyl with 1 to 6 carbon atoms;
$Z^1$=alkyl with 1 to 10 carbon atoms or aryl;
$Z^2$=aryl or heteroaryl; and
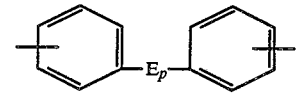
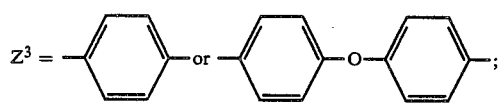
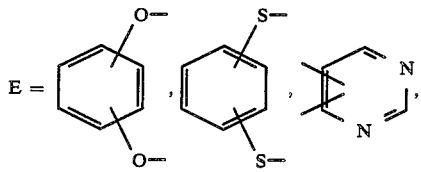
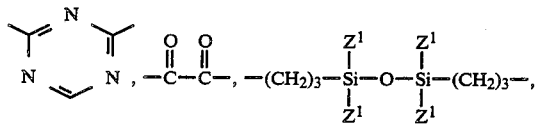
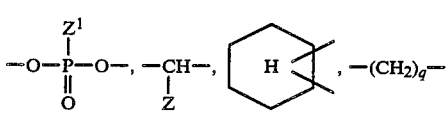
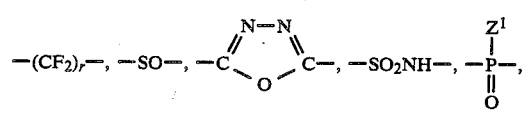

4,590,103
-continued
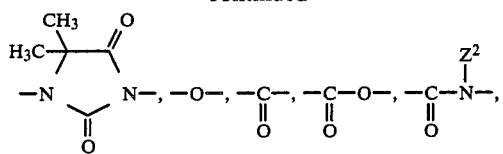
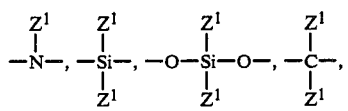
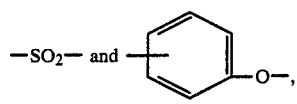
where q=2 to 14 and r=2 to 18, and Z, $Z^1$ and $Z^2$ are defined as above.
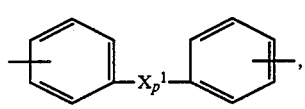
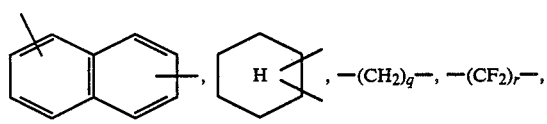
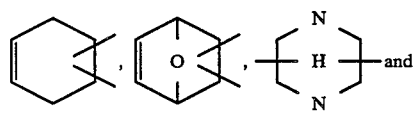
where p=0 or 1, q=2 to 14 and r=2 to 18.
For $X^1$, the following applies:
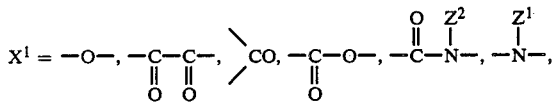
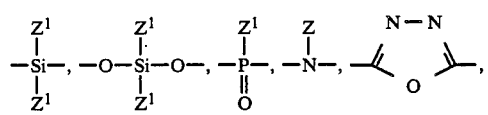
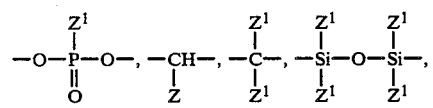
-continued
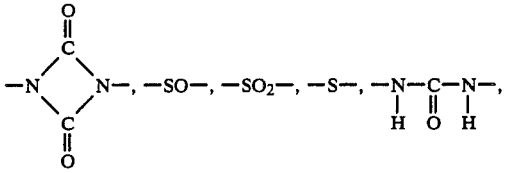
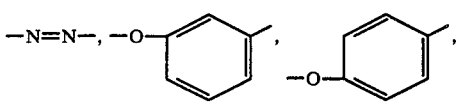
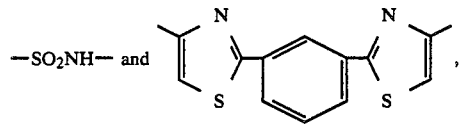
where Z, $Z^1$ and $Z^2$ are defined as above.
$$R^2 = -CH_2-CH-R^3,$$
$$\phantom{R^2 = -CH_2-C}R^4$$
where the following applies to $R^3$ and $R^4$:
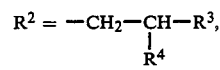
with
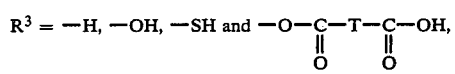
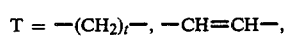
where t=2 to 20.
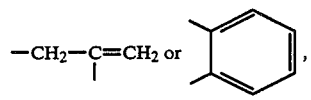
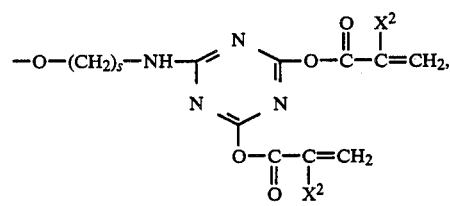
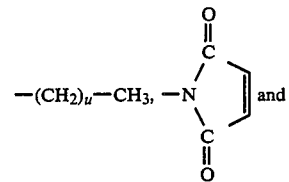
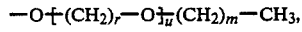
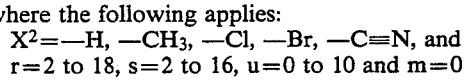
where the following applies:
$X^2$=—H, —$CH_3$, —Cl, —Br, —C≡N, and
r=2 to 18, s=2 to 16, u=0 to 10 and m=0 to 17.

Suitable compounds of the above-mentioned type are described for example, in U.S. Pat. No. 3,957,512. Also suitable are addition products of olefinically unsaturated monoepoxides with carboxyl group-containing polyaddition products of aromatic and/or heterocyclic tetracarboxylic acid dianhydrides and diamino compounds (see in this connection, German Offenlegungsschrift No. 29 33 826). The preferably employed tetracarboxylic acid dianhydrides are the anhydride of pyromellithic acid and the anhydride of benzophenone tetracarboxylic acid. However, trimellithic acid anhydride of the following structure (2), for example, also can be used:

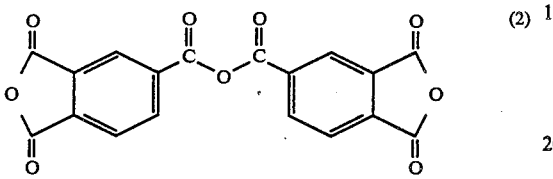
(2)

or the diester dianhydride of the structure (3):

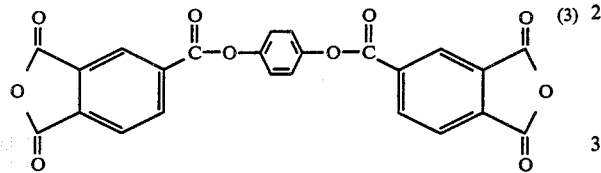
(3)

Among the diamino compounds, 4,4'-diaminodiphenyl ether is preferred.

The structure of the polyimide prepolymers preferably used in the method according to the present invention will be illustrated by way of example by means of the following Formula (4):

However, the term "polyimides" is also used herein to include polyester imides (6) and polyamide imides (7):

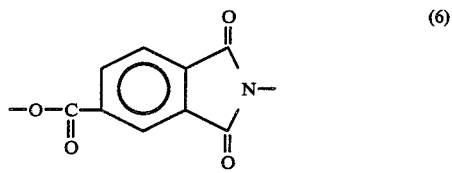
(6)

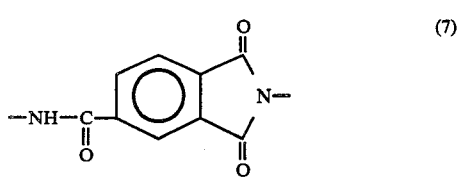
(7)

The polyimide prepolymers preferably employed in the method according to the present invention advantageously are prepared in such a manner that an aromatic and/or heterocyclic tetracarboxylic acid dianhydride is reacted with a diamino compound to form a carboxyl group-containing reaction product and the reaction product is then brought into reaction with an olefinically unsaturated monoepoxide at room temperature or at temperatures of up to about 100° C. in an organic solvent, optionally in the presence of an aminic catalyst. The precursor stage obtained by addition of the monoepoxide on the carboxyl group-containing reaction product can further be reacted also with cyclic carboxylic acid anhydrides. In this manner, the size of the groups which can be split off in the annealing can be increased further, i.e., it becomes possible to adjust or to influence the reduction of layer thickness in a predetermined manner.

With the method according to the present invention, it is further of advantage if monomer, oligomeer and/or

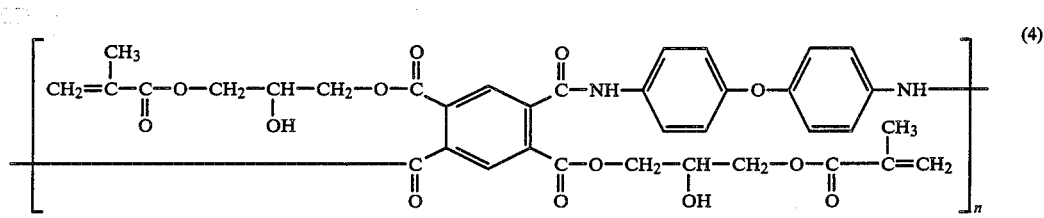
(4)

In Formula (4), a radiation-reactive polyimide precursor stage is shown, and specifically the addition product of glycidylmethacrylate with the polyaddition product of pyromellithic acid dianhydride and 4,4'-diaminodiphenyl ether.

The prepolymers employed in the method according to the present invention preferably have aromatic carboxylic acids as the basic building blocks and thus furnish polyimides with the following structural unit (5) in the thermal annealing treatment:

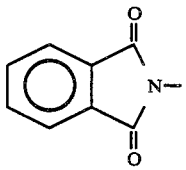
(5)

polymer compounds are added to the prepolymer solution, which are volatilized or broken down to form volatile components at temperatures of $\geq 250°$ C., i.e., in the annealing process. In this manner, a further reduction of the layer thickness can be achieved, i.e., an increase of the effect of layer thickness reduction.

Suitable additives which evaporate during the annealing process and can lead to layer thickness reductions of 40% and more, are, for example, light-sensitive diazoquinones (o-quinone and o-naphthoquinone diazides). Suitable known compounds of this type are, for example:

N-dehydroabietyl-6-diazo-5(6)-oxo-1-naphthaline sulfonamide

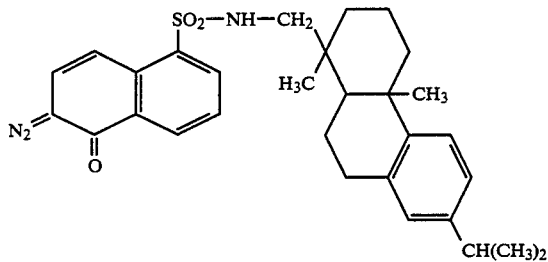

and bis-naphthoquinone-(1,2)-diazide-(2)-5 sulfonic acid ester of β,β-bis(4-hydroxyphenyl)-propane:

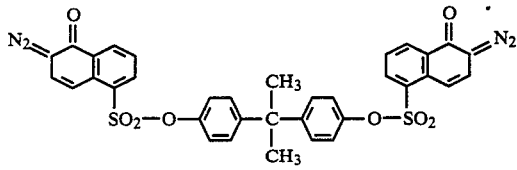

Further compounds are, for example:
N-dehydroabietyl-3-diazo-4(3)-oxo-1-naphthaline sulfonamide, N-dehydroabietyl-5,6,7,8-tetrahydro-4-diazo-3(4)-oxo-2-naphthaline sulfonamide and N-dextropimaryl-3-diazo-4-oxo-1,5-cyclohexadiene-1 sulfonamide.

Further suitable additives which become volatile at temperatures of ≧250° C. are, for example, oligomeric esters and ethers with aliphatic or cycloaliphatic structure elements, where also merely a partial decomposition into volatile dissociation products can take place. Under this feature, polymer additives also are suitable, such as polymethylmethacrylate and polyolefin sulfones, which become volatile in the thermal decomposition and thereby contribute to the layer thickness reduction.

DETAILED DESCRIPTION OF THE INVENTION

The invention is explained in greater detail with reference to the following embodiment examples.

EXAMPLE 1

21.8 parts by weight pyromellithic-acid dianhydride are dissolved in 100 parts by volume hexamethyl phosphoric-acid triamide, reacted dropwise, while being cooled with ice and stirred, with 26 parts by weight methacrylic acid-2-hydroxyethyl ester, and then stirred for 4 days at room temperature. The solution is subsequently reacted at a temperature from −5° to −10° C. with 24 parts by weight thionyl chloride and then stirred still another hour. Subsequently a solution of 19.8 parts by weight 4,4'-diaminodiphenyl ether in 50 parts by volume dimethylacetamide is added dropwise and stirred, without cooling, for still another hour. By dropwise adding the solution to 2000 parts by volume water, the polyamidocarboxylic acid ester is precipitated and is washed with water and ethanol.

10 g of the polyamido carboxylic acid ester are dissolved together with 0.1 g vinyltriethoxymethoxy silane in 90 ml N-methylpyrrolidone and applied to a glass substrate by the roller coating method. After drying at about 100° C. in a circulating-air oven (with 25% fresh air supply) for 30 minutes, the layer thickness is 0.04 μm. Subsequently, the film obtained is annealed for ½ hour at about 275° C. and ½ hour at about 400° C. There results a film with a layer thickness of 0.02 μm, and the surface quality of the film is not affected adversely.

EXAMPLE 2

10 g of a polyamido carboxylic acid ester prepared in accordance with Example 1 are dissolved together with 10 g N-dextropimaryl-3-diazo-4-oxo-1,5-cyclohexadiene-1-sulfonamide in 180 ml N-methyl-pyrrolidone. By the roller coating method, a film 0.1 μm thick is produced with this solution on a glass substrate 5 cm×5 cm. The layer thickness refers to the film dried at 80° C. in a continuous oven. After subsequent annealing at about 275° C. and about 400° C., each for ½ hour, the final layer thickness of the homogeneous film is 0.03 μm.

EXAMPLE 3

To 65.4 parts by weight pyromellithic acid dianhydride (0.3 mol) in 450 parts by volume N-methyl pyrrolidone are added, while stirring, 45 parts by weight 4,4'-diaminodiphenyl ether (0.23 mol) and subsequently, stirring takes place at room temperature for another 2 hours. Thereafter, 2 parts by weight methacrylic acid-2-hydroxyethyl ester (0.016 mol) are added to the reaction mixture in order to bind the still present anhydride groups in end position. After stirring at room temperature for 2 hours, 150 parts by volume glycidyl methacrylate, 1.5 parts by volume benzyldimethylamine and 0.1 part by weight hydroquinone are added to the reaction solution. Subsequently, the solution is heated to a temperature of 50° to 60° C. for 23 hours, while stirring, and is then added dropwise to 4000 parts by volume ethanol while stirring vigorously. The precipitate then formed is suctioned off and is dried in a vacuum at room temperature.

35 parts by weight of the polyimide precursor stage obtained are dissolved in 100 parts by volume N-methylpyrrolidone and reacted with 10 parts by weight maleic acid dianhydride. After a reaction time of 5 days at room temperature, the resin solution is diluted with 50 parts by volume N-methylpyrrolidone and is precipitated from 2500 parts by volume water. The resin obtained is washed with water and dried in a vacuum.

10 g of the polyamido carboxylic acid ester are dissolved, together with 0.1 g vinyltriethoxymethoxy silane, in 92 ml N-methylpyrrolidone and centrifuged onto a glass substrate at 3000 RPM. After drying in a circulating-air oven (with fresh-air supply) at about 110° C. for a period of 25 minutes, the layer thickness is 0.08 μm. After subsequent annealing for ½ hour each at about 275° C. and 400° C., the layer thickness is 0.03 μm. The thin film produced in this manner exhibits a homogeneous surface.

What is claimed is:

1. In a method for preparing polyimide layers having a thickness of less than about 0.2 μm, wherein a solution of a polyimide prepolymer is applied to a substrate in the form of a film and the applied film is thereafter annealed to convert the prepolymer to polyimide, the improvement wherein said prepolymer is a film-forming prepolymer of a highly heat-resistant polyimide, said solution of said prepolymer also contains a compound selected from a diazoquinone, an oligomeric ester or ether having an aliphatic or cycloaliphatic structural element, polymethylmethacrylate or a polyolefin sulfone, which compound is volatilized in the annealing process, and, during annealing, said solution gives off a percentage of volatile products, relative to its total weight, which is sufficiently large to result in a reduction in the thickness of the applied film of at least about 40%.

2. A method according to claim 1 wherein said prepolymer, during the annealing, gives off high molecular weight alcohols as volatile products in the formation of the polyimide.

3. A method according to claim 1 wherein said solution of said prepolymer has added thereto a silane.

* * * * *